Feb. 9, 1926 Re. 16,260

W. F. FRASER

GRINDING MACHINE

Original Filed March 28, 1921 5 Sheets-Sheet 1

INVENTOR
Warren F. Fraser
BY
J. E. McCarty
Its ATTORNEY

Feb. 9, 1926.

Re. 16,260

W. F. FRASER

GRINDING MACHINE

Original Filed March 28, 1921 5 Sheets-Sheet 2

INVENTOR
Warren F. Fraser
BY
J. E. McCrady
Its ATTORNEY

Feb. 9, 1926. Re. 16,260

W. F. FRASER

GRINDING MACHINE

Original Filed March 28, 1921 5 Sheets-Sheet 3

INVENTOR
Warren F. Fraser
BY
J. H. McCrady
Its ATTORNEY

Feb. 9, 1926. Re. 16,260

W. F. FRASER

GRINDING MACHINE

Original Filed March 28, 1921 5 Sheets-Sheet 4

INVENTOR
Warren F. Fraser
BY
J. H. McCrady
his ATTORNEY

Feb. 9, 1926. Re. 16,260

W. F. FRASER

GRINDING MACHINE

Original Filed March 28, 1921 5 Sheets-Sheet 5

INVENTOR
Warren F. Fraser
BY
J. E. McCrady
his ATTORNEY

Reissued Feb. 9, 1926.

Re. 16,260

UNITED STATES PATENT OFFICE.

WARREN F. FRASER, OF WESTBORO, MASSACHUSETTS.

GRINDING MACHINE.

Original No. 1,470,605, dated October 16, 1923, Serial No. 456,411, filed March 28, 1921. Application for reissue filed August 4, 1925. Serial No. 48,131.

*To all whom it may concern:*

Be it known that I, WARREN F. FRASER, a citizen of the United States, residing at Westboro, in the county of Worcester and State of Massachusetts, have invented a new and useful Grinding Machine, of which the following is a specification.

This invention relates to improvements in grinding machines.

The object of the invention is to provide a machine which will automatically feed blanks into a grinding machine and accurately position, hold and grind said blanks to the desired shape and dimensions of the finished article and then automatically eject the finished article from the machine.

In the machine of this invention the blanks to be ground are placed in a tube or magazine which is then positioned upon the machine and the blanks are taken one at a time and carried forward between the centers of a head and tail-stock. The blank so carried is then pushed by the tail-stock center into a chuck or other suitable positioning or holding device on the head-stock. A rotary motion is imparted to the chuck and the blank held thereby and the grinding wheel is then brought forward quickly to engage the blank. The grinding wheel has a rotary motion imparted to it and also a reciprocatory movement laterally thereof as well as a reciprocatory movement toward and away from the article to be ground. After the grinding wheel engages the blank, it is fed slowly into the work until it arrives at the limit of its forward feeding movement, whereupon it is accurately positioned by a stop, and while so positioned, the rotation of the grinder and of the article being ground continues as well as the lateral reciprocatory movement of the grinding wheel until all backlash or play has been taken up and the article has been ground to a fine finish and accurately dimensioned, whereupon the grinding wheel retreats quickly. The rotation of the work is stopped, the grip of the chuck upon the article is released and the tail-stock is backed off releasing the finished article so that it drops out of the machine into a conveniently located receptacle beneath the same. Another blank is then fed into the machine and the operation hereinbefore set forth is repeated. It will be understood that all of the different operations hereinbefore set forth are automatic in their action. The machine is also provided with the usual devices for directing water upon the work during the grinding thereof to keep it cool.

The invention consists in the instrumentalities whereby the operations hereinbefore set forth and others more particularly referred to hereinafter are accomplished and particularly the invention consists in the combination and arrangement of parts set forth in the following specification and pointed out in the claims.

Referring to the drawings.

Like numerals refer to like parts throughout the several views of the drawings.

*Main driving mechanism.*

Figure 1:
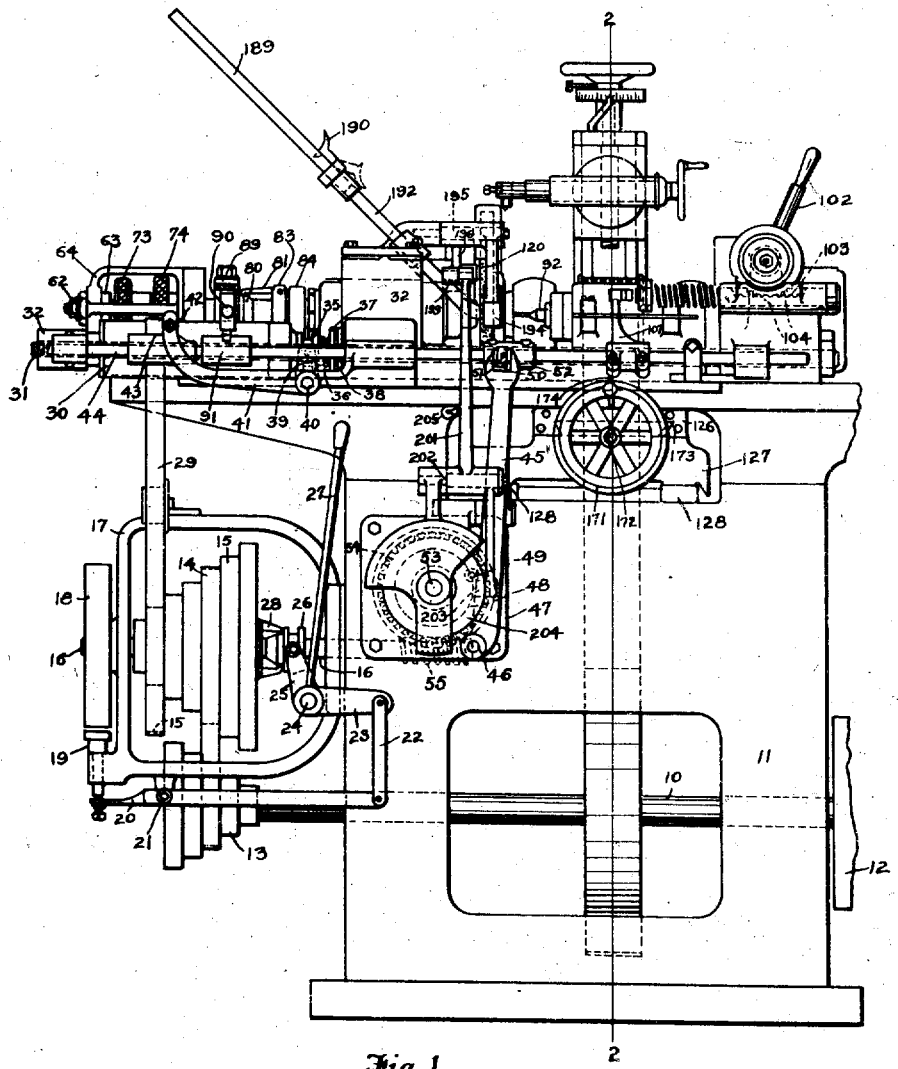
Figure 1 is a front elevation of my improved grinding machine broken away at the right thereof to save space in the drawings.

In the drawings, 10 is the main driving shaft of the machine journalled in suitable bearings on a frame 11 and driven by a pulley 12. A cone pulley 13 is fast to the shaft 10 and is connected by a belt 14 to another cone pulley 15 which is loosely mounted to rotate upon a countershaft 16 journalled in a bracket 17 fast to said frame 11. On the outer end of the shaft 16 is fastened a brake pulley 18 which is engaged by a brake 19 operated by a lever 20 and pivoted at 21 to the bracket 17. The brake lever 20 is connected by a link 22 to an arm 23 fast to a rock shaft 24 to which rock shaft is also fastened a bifurcated lever 25 which engages a slidable clutch member 26 in the usual well known manner. The shaft 24 is rocked by a hand lever 27 to throw the clutch member 26 into and out of engagement with the clutch fingers 28 which operate to lock the cone pulley 14 to the countershaft 16.

*Head-stock chuck operating mechanism.*

Figure 3:
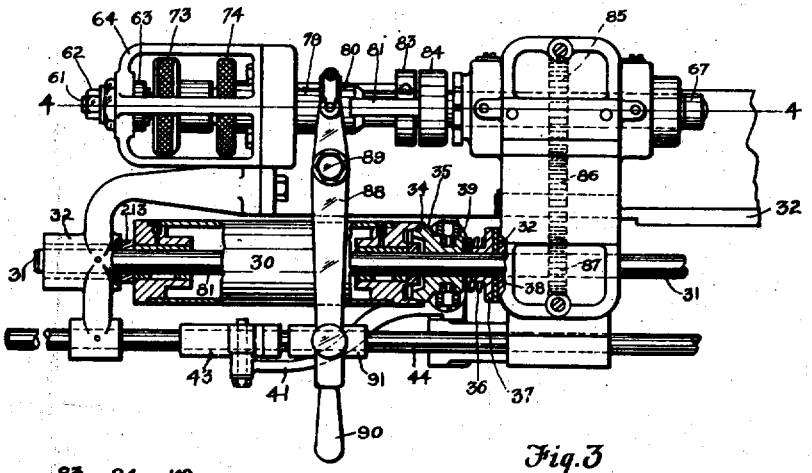
Fig. 3 is a plan partly shown in section of the head-stock and connecting mechanism.

The cone pulley 15 carries a pulley 15′ which is connected by a belt 29 to a drum pulley 30, Figs. 1 and 3, which is mounted to rotate upon the shaft 31 which, in turn, is rotatably mounted in bearings on the head-stock frame 32, the head-stock frame being mounted adjustable in the usual manner upon a bed 33 on the frame 11. The drum 30 is provided at one end thereof with a conical recess 34 adapted to receive a conical clutch member 35 which is splined to slide upon the shaft 31 and said clutch member 35 is moved into engagement with the drum 30 by a spring 36 encircling the shaft 31 and bearing at one end against the clutch member 35 and at the other end against a collar 37 which is rigidly secured to the shaft 31, and when the clutch member 35 is disengaged or withdrawn from the conical recess 34, the spring 36 causes the collar 37 to press against a fibre washer 38 interposed between said collar 37 and head-stock frame 32. When the clamp member 35 is engaged with the conical recess 34, the tension of the spring 36 is taken between the collar 37 and collar 213, both of which are rigidly secured to the shaft 31. In this position, which is the normal driving position of the head-stock mechanism, the collar 37 performs the ordinary functions of a shoulder or set collar to prevent end motion of the shaft 31. The clutch member 35 is moved away from the drum 30 and out of engagement therewith by an arm 39 which is mounted to rock upon a shaft 40, Fig. 1, and has an arm 41 which has a roll 42 rotatably mounted on its free end and adapted to engage a cam plate 43 which is fastened to a rod 44 slidably mounted on the head-stock and tail-stock frames. A reciprocatory motion is imparted to the rod 44 by a lever 45 which is pivoted at 46 to an auxiliary frame 47 fast to the frame 11. Motion is imparted to the lever 45 by a cam 48 which engages a roll 49 on the lever 45. The upper end of the lever 45 is slotted at 50 to engage a block 51 pivotally mounted upon a sleeve 52 which is fastened to the rod 44. The cam 48 is fastened to a shaft 53 and rotary motion is imparted to said shaft 53 and the cam 48 by a worm gear 54 which is fastened to the shaft 53 and is rotated by a worm 55 fast to the countershaft 16.

Figure 6:
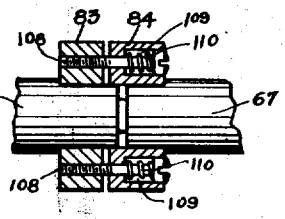
Fig. 6 is an enlarged sectional elevation taken on the line 6—6, Fig. 4.
Figure 4:
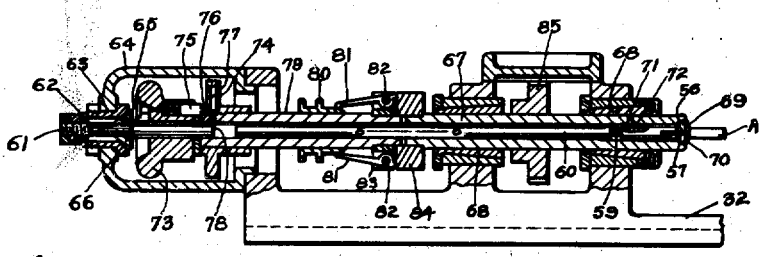
Fig. 4 is a sectional elevation taken on the line 4—4, Fig. 3.
Figure 5:
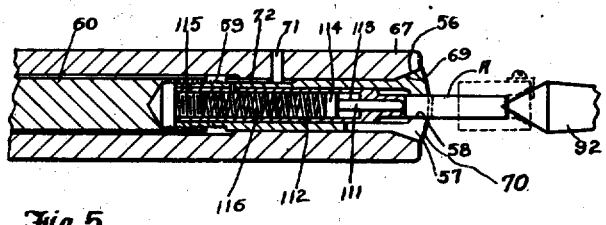
Fig. 5 is a detail, sectional elevation of the chuck showing a blank held in position with the feed fingers shown in dotted lines in connection therewith and with the tail-stock spindle engaging one end of the blank.

Referring to Figs. 4, 5 and 6, the chuck consists of a gripping member 56 split at 57 and provided with a recess 58 adapted to receive one end of the blank A which is to be ground. The gripping member 56 has a screw-threaded shank 59 at its rear end which has screw-threaded engagement with a shaft 60. The rear end of the shaft 60 is screw-threaded at 61 to receive a nut 62 which bears against one end of a bearing 63 provided in the bracket 64 fast to the head-stock frame 32. The bearing 63 at the opposite end from the nut 62 is provided with a conical recess 65 into which a conical collar 66 fast to the shaft 60 projects. A clutch sleeve 67 is rotatably mounted in bearings 68 provided in the head-stock frame 33 and is provided at its front end with a conical recess 69 into which a conical head 70 of the gripping member 56 projects. The gripping member 56 is prevented from rotating relatively to the sleeve 67 by a pin 71 which projects into a slot 72 extending longitudinally of said gripping member. In order to adjust the gripping member longitudinally thereof within the clutch sleeve 67 a hand wheel 73 is fastened to and adapted to rotate the shaft 60 and is adjustably locked to a collar 74 by a spring actuated pin 75 which is adapted to project into any one of a series of recesses 76 provided in the collar 74 and concentric with the shaft 60. A screw 77 in the collar 74 engages an annular groove 78 in the shaft 60. The collar 74 is fastened to a sleeve 79 rotatably mounted upon the shaft 60 and upon the sleeve 79 is slidably mounted a clutch member 80 adapted to engage clutch fingers 81 pivoted at 82 upon a collar 83 fast to the sleeve 79. The collars 83 and 84 are prevented from rotating relatively to each other by screws 108 which have screw-threaded engagement in the collar 83 and have their headed ends slidably positioned in recesses 109 in the collar 84. The screws 108 are encircled by springs 110 between their heads and the bottoms of the recesses 109. The collar 84 is slidably mounted on the screws 108 and the springs 109 tend to push the collar 84 toward the collar 83 and as the collar 84 is fastened to the sleeve 67, the tendency of this action of the springs is to move the collar 84 and sleeve 67 toward the left, Figs. 4 and 5, to release the split end of the gripping member 56 and the blank A held thereby. The clutch fingers 81 are adapted when the clutch member 80 is moved toward the right, Fig. 4, to engage one side face of the collar 84 which is fastened to the sleeve 67 and thus cause the sleeve 67 to be pushed toward the right, Fig. 4, and as the shaft 60 cannot be moved longitudinally thereof, the conical surface 69 upon the clutch sleeve will engage the conical portion 70 of the clutch gripping member and cause the same to grip the blank A which has been inserted therein as will be hereinafter described. A rotary motion is imparted to the clutch sleeve 67 and to the clutch gripping member 56 and consequently to the blank gripped thereby by a gear 85 which is fast to the clutch sleeve 67 and meshes into an intermediate gear 86, which, in turn, meshes into a gear 87 fast to the shaft 31. The clutch member 80 is moved longitudinally of the sleeve 79 by a lever 88, Fig. 3, pivoted at 89 to the head-stock frame 32. This lever 88 may be operated either by hand by means of a handle 90, or automatically operated by a sleeve 91 which is connected thereto and is fastened to the rod 44.

*Tail-stock mechanism.*

Figure 7:
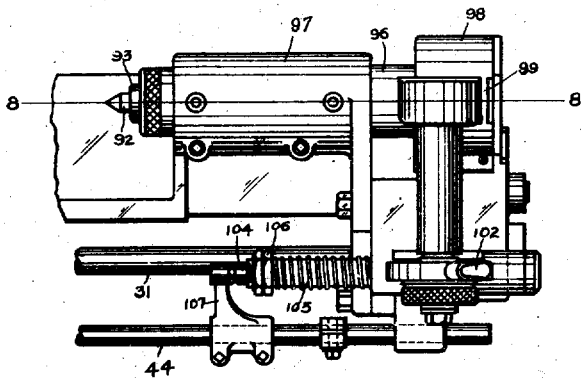
Fig. 7 is a plan of the tail-stock and connecting mechanism.

Referring to Figs. 1, 7, 8 and 9, the tail-stock center 92 is fast to a spindle 93 which is rotatably mounted in bearings 94 and 95 in an auxiliary frame 96 adapted to slide longitudinally of the spindle 93 in the tail-stock frame 97 and is provided with a head 98 which has a rack 99 thereon adapted to be engaged by a pinion 100. The pinion 100 is fast to a shaft 101 which may be rotated by a hand lever 102 or by a gear 103 fast to the shaft 101 and engaging a rack bar 104 slidably mounted in the tail-stock frame and projecting therebeyond as shown in Figs. 1 and 7. The rack bar 104 is surrounded by a spring 105, one end of which engages the tail-stock frame and the other end of which engages a nut 106 having screw-threaded engagement with said rack bar. The tendency of the spring 105 is to move the rack bar toward the left, Figs. 1 and 7, and said rack bar is moved toward the right by a dog 107 which is fastened to the rod 44.

When the tail-stock center 92 has been moved toward the right, as hereinbefore described, and the blank A has thus been released, both by the center 92 and by the chuck 56, the blank A may fall downwardly out of the machine into a convenient receptacle, or it may be ejected from the gripping member 56 by a pin 111 which is slidably mounted in a holder 112 located within and fast to the clutch member 56. The holder 112 is provided with a chamber 113 in which the head 114 of the ejector is slidably mounted. In the opposite end of said chamber is located a screw 115 against which one end of a spring 116 abuts, the opposite end of said spring bearing against the head 114 so that when the blank A is released by the gripping chuck member 56 and by the tail-stock center 92, the ejector 111 is forced toward the right, Fig. 5, by the spring 116 and pushes the blank A out of the chuck member. It will be seen by reference to Fig. 5 that when the blank A is pushed into the chuck member 56 by the tail-stock and its spindle 92 due to the action of the spring 105, as hereinbefore described, and the end of the blank A abuts against the end of the holder 112, further movement of the blank and of the tail-stock spindle toward the left, Fig. 5, will be arrested.

Figure 8:
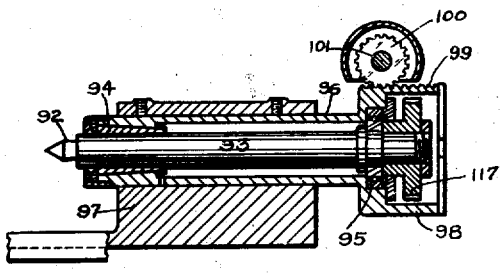
Fig. 8 is a sectional elevation taken on the line 8—8, Fig. 7.
Figure 9:
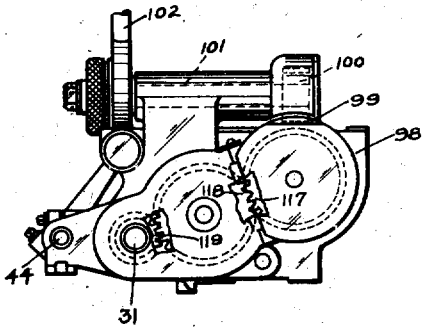
Fig. 9 is an end elevation of the mechanism illustrated in Fig. 7 as viewed from the right of Fig. 7.

A rotary motion is imparted to the tail-stock spindle 93 by a gear 117, see Figs. 8 and 9, which is fastened to said spindle and meshes into a gear 118, which, in turn, meshes into a gear 119 fast to the shaft 31 which as hereinbefore set forth is driven by the drum 30 when said drum is connected to the shaft by the clutch 35.

*Grinding wheel mechanism.*

Figure 11:
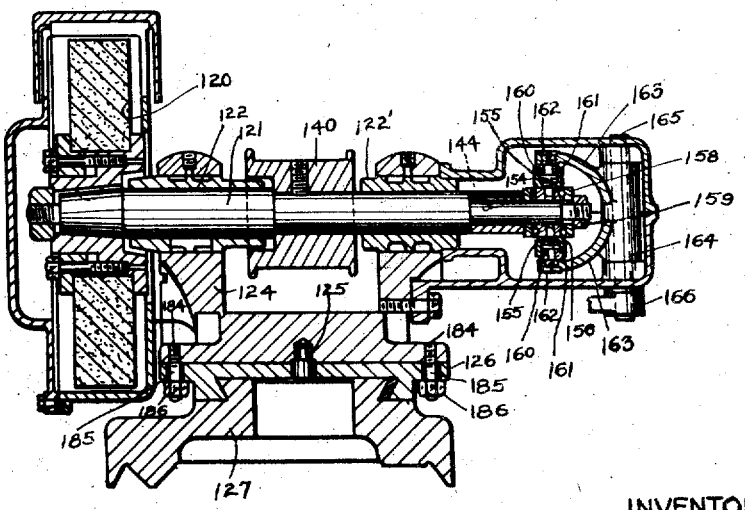
Fig. 11 is a sectional elevation taken on the line 11—11, Fig. 10, and illustrating the grinding wheel and the mechanism by which it is rotated and reciprocated laterally thereof.

The grinding wheel 120, Fig. 11, is fastened to a shaft 121 which is rotatably mounted in bearings 122, 122′ provided in a table 124 which is pivoted at 125 to a slide 126. The slide 126 is adjustably mounted on a carriage 127, and the carriage 127 is slidably mounted on ways 128 provided on the frame 11 of the machine. A reciprocatory motion toward and away from the work is imparted to the grinding wheel 120, shaft 121, table 124, slide 126 and carriage 127 as a unit by a link 129, Fig. 2, which is connected to a lever 130 pivoted at 131 to the auxiliary frame 47. The lower end of the lever 130 is provided with a cam roll 132 which engages a cam 133 fast to the shaft 53, (Fig. 2).

In order to eliminate any inaccuracies or lost motion which may occur between the cam 133, lever 130, link 129 and carriage 127 during the feeding of the carriage and the grinding operation, and to thereby increase the accuracy of said operation an adjustable stop is provided to limit the forward movement of the carriage 127. Fast to the rear of the frame 11 is a bracket 134 and projecting rearwardly from the carriage 127 is a rod 135 which passes through an opening in the bracket 134 and is provided with a thumb nut 136 which has screw-threaded engagement with the rod 135 and is adapted to abut against the bracket 134 when the carriage is in its extreme forward position. The thumb nut 136 is provided with suitable graduations 137 which extend around the hub portion thereof and register with a suitable mark upon the bracket 134. The graduations 137 represent in one-thousandths of an inch the movement of the carriage 127. A lock nut 138 also has screw-threaded engagement with the rod 135 and is attached to the thumb nut 136 by screws 139 being rotatable with said thumb nut. In locating the thumb nut 136 upon the rod 135, the said nut is so positioned that during the forward movement of the carriage 127 the nut 136 will abut against the bracket 134 about .0002 of an inch in advance of the actual extreme forward position of the carriage, the lever 130 yielding enough to offset the distance lacking. The arrangement of the thumb nut 136 and lock nut 138 also eliminates any lost motion therebetween when the screws 139 are tightened to clamp said nuts upon the screw threads to prevent rotation thereof.

Figure 2:
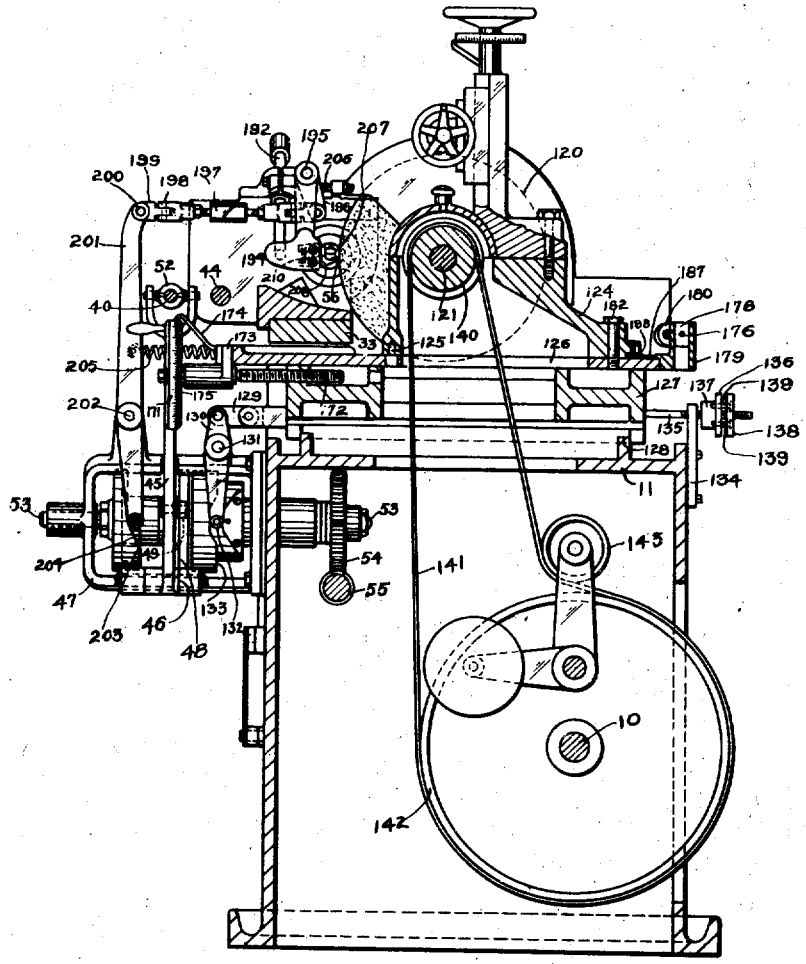
Fig. 2 is a sectional elevation taken on the line 2—2, Fig. 1, looking toward the left in said Fig. 1.

A rotary motion is imparted to the grinding wheel 120 by its shaft 121 and by a pulley 140 fast thereto, the pulley 140 being rotated, see Fig. 2, by a belt 141 which is driven by a pulley 142, fast to the main driving shaft 10. The belt 141 is kept tight at all times during the reciprocation of the grinding wheel by a belt tightener 143.

Figure 10:
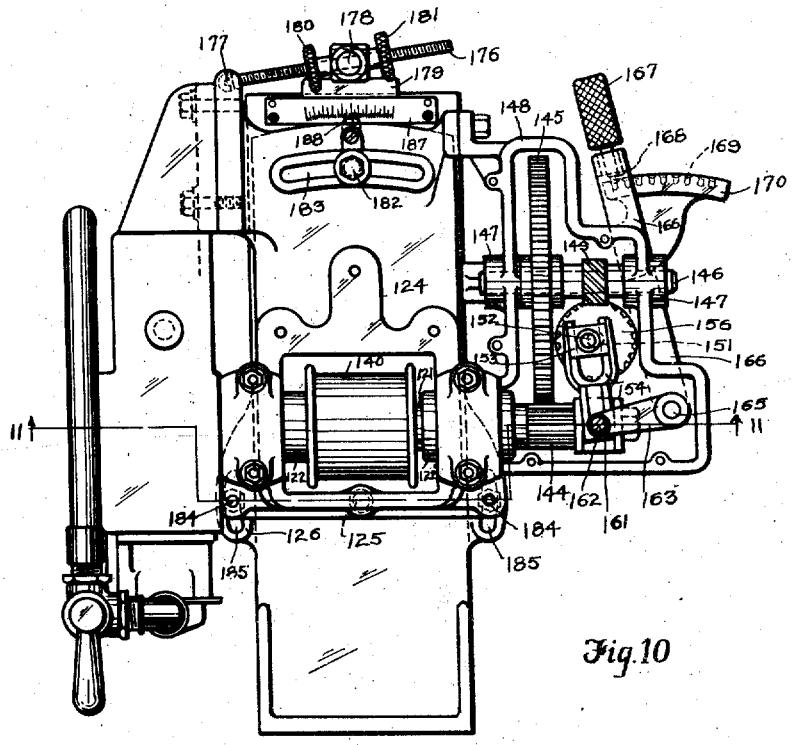
Fig. 10 is a plan of the grinding wheel mechanism.

The grinding wheel 120 has a reciprocatory motion imparted thereto laterally thereof and longitudinally or axially of its shaft 121 by mechanism illustrated in Figs. 10 and 11 and consisting of a pinion 144 fast to the grinding wheel shaft 121 and meshing into a gear 145, Fig. 10. The gear 145 is fastened to a shaft 146 journalled in bearings 147 on an auxiliary frame 148 which is fastened to the table 124. The shaft 146 has a spiral gear 149 fast thereto which meshes into another spiral gear 150 which is fastened to a shaft 151 journalled to rotate in bearings provided in the auxiliary frame 148 and having upon its face an eccentric pin 152 which projects through a block 153 slidably mounted in the bifurcated end of an arm 154. The arm 154 is bifurcated at its lower end and has a pair of oppositely disposed screws 155 therein which project into a ring 156 rotatably mounted upon the shaft 121 and held in position thereon longitudinally thereof by ball bearings 157 and 158 and by a nut 159 which has screw-threaded engagement with the rear end of the shaft 121. The arm 154 is provided upon opposite sides thereof with a pair of sliding blocks 160 which are arranged to slide in ways 161 provided in said arm 154 and these sliding blocks are pivoted by means of screws 162 to the arms 163 of a lever 164 which is fastened to a rock shaft 165 journalled to rock in the auxiliary frame 148 and having fastened to one end thereof a lever 166. The lever 166, Figs. 10 and 11, is provided with a handle 167 by means of which it may be operated and also is provided with a spring actuated pin 168 slidably mounted on the lever 166 and adapted to engage any one of a series of holes 169 provided in a segmental bracket 170 which is fastened to the auxiliary frame 148 so that the lever 166 can be moved to different positions and locked therein by the pin 168.

In the position shown in Fig. 10 the lever 166 positions the shaft 165 and the arms 163 so that the pivotal screws 162 will be concentric with the centers of the screws 155 and, therefore, when the gear 150 is rotated, the eccentric pin 152 will rock the arm 154 upon the screws 155 without imparting any longitudinal movement to the shaft 121 and the grinding wheel fastened thereto, but when the lever 166 is moved toward the right, Fig. 10, then the arms 163 will move the fulcrum screws 162 along the lever 154, together with the sliding blocks 160, and the fulcrum of the lever 154 will then be located at one side of the screws 155 and consequently an axial reciprocatory motion will be imparted to the shaft 121 and the grinding wheel attached thereto. The further the lever 166 is moved to the right, Fig. 10, the greater will be the throw imparted to the shaft 121 longitudinally thereof. Thus it will be seen that the grinding wheel may be reciprocated laterally thereof or longitudinally of its shaft to any desired extent. This reciprocatory motion of the grinding wheel laterally thereof is for the purpose of breaking up any lines in the grinding of the finished article.

The grinding wheel 120 as it wears and as it is trimmed off to make it true upon its periphery has to be adjusted to make up for the difference in diameter of the grinding wheel thus occasioned and this adjustment is performed by means of a hand wheel 171, Fig. 2, which is fast to a screw 172 having screw-threaded engagement with the carriage 127 and is rotatably mounted in a bracket 173 which is fastened to the slide 126. By rotating the hand wheel 171 in one direction or the other the screw 172 will be rotated and this will cause the slide 126 to be moved upon the carriage 127 forwardly or backwardly as the case may be, and will move the grinding wheel forwardly or backwardly to make up for wear on the periphery of the grinding wheel. An index finger 174 is fast to the bracket 173 and graduations are provided upon the surface 175 of the wheel 171 to indicate the amount which the wheel 171 is to be turned for adjusting the grinding wheel in the manner hereinbefore set forth.

For certain classes of work it is desirable to set the grinding wheel at different angles in order to produce tapered work, that is, to grind on the article a surface which is inclined at an angle to the axis thereof, and for this purpose the table 124, and the grinding wheel with its shaft, are set at different angles by means of a screw 176 which is pivoted, see Fig. 10, to the pivotal pin 177 which is fastened to the table 124. The screw 176 projects through a pin 178 rotatably mounted in a bracket 179 fast to the slide 126. The screw 176 is provided with adjusting nuts 180 and 181, Fig. 10. The table 124 is fastened to the slide 126 by a screw 182, Figs. 2 and 10, which projects through a slot 183 in the table 124 and has screw-threaded engagement with the slide 126, and further, the table 124 is fastened to the slide 126 by bolts 184 which have screw-threaded engagement with the table 124 and project through slots 185 in the slide 126, said bolts being provided with nuts 186 and thus the table 124, with the parts mounted thereon, can be set at any desired angle upon the slide 126 and clamped thereto. This operation is performed by loosening up the nuts 186 and the screw 182 and rotating the nuts 180 and 181, thus rotating the table 124 about the pivot 125. The amount that the table 124 is rotated about its pivot is measured by a scale 187 fast to the slide 126 and an index finger 188 fast to the table 124.

*Blank feeding mechanism.*

Figure 12:
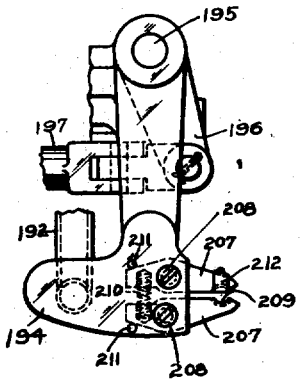
Fig. 12 is a detail view of the blank feeding arm and fingers.

The blanks A are placed by the operator in a tube 189, Fig. 1, and are prevented from passing out of the lower end of the tube prior to its being placed upon the machine by a stop finger 190 pivoted to a collar 191 which is fastened to the lower end of the tube 189, said stop finger projecting into the tube 189 to engage the lowermost blank in said tube, and preventing its passing downwardly and out of the tube. A magazine tube 192 is fastened to the headstock of the machine and has a sleeve 193 fast to its upper end into which the lower end of the tube 189 projects, while the collar 191 rests against the upper end of the sleeve 193. The stop finger 190 is then thrown outwardly and backwardly into the position shown in dotted lines, Fig. 1, and the blanks A are then free to slide from the tube 189 down through the magazine tube 192 to the lower end thereof, and when they arrive at said lower end, the lowermost blank will abut against the adjacent face of an arm 194 when the parts are in the position illustrated in Fig. 2. The arm 194 is mounted to rock on a stud 195, Fig. 12, and has an arm 196 connected by a link 197 by means (Fig. 2) of a pin 198 to another link 199 which is pivotally connected at 200 to a lever 201 pivoted at 202 to the auxiliary frame 47. The lower end of the lever 201 has a roll 203 rotatably mounted thereon and engaging a cam 204 which is fast to the shaft 53 and a spring 205 is connected to the lever 201 and keeps the roll 203 in engagement with said cam 204. The distance to which the arm 196 can be rocked by the spring 205 and the cam 204 is adjusted by means of a screw 206 which is adapted to engage the arm 196 when the arm 194 is in the position illustrated in Fig. 2, that is, in the position where the blank is delivered to the chuck and tail-stock spindle. The arm 194 has two fingers 207 pivoted at 208 to said arm. These fingers are provided with semi-circular notches 209 in their forward ends and are kept apart at their rear ends by a spring 210, the distance to which they can be moved apart being limited by stop pins 211. A stop plate 212 is fastened to the upper finger 207 to prevent the blank when it slides out of the magazine from sliding from between the fingers 207 and dropping on the floor.

*General operation.*

Assuming that the machine is in a position where it has dropped out one finished article and is ready to receive a blank to grind the same into a finished article, the operator starts the machine by moving the handle 27, Fig. 1, to the left. This would cause the clutch member 26 to engage the fingers 28 and lock the pulley 14 to the shaft 16, whereupon the cam shaft 53 will be caused to rotate through the medium of the worm 55 and gear 54, thus rotating all of the cams on said shaft 53, namely cams 48, 133 and 204. This would perform the following operation in the sequence named, first a blank A would be brought from the magazine tube 192 by the fingers 207 and arm 194 into alignment with the chuck 56 and tail-stock center 92. The tail-stock center would then be brought forward by the action of the spring 105 and would push the blank A into the chuck 56. The chuck would then be closed upon the blank by the operation of the lever 88 which would push the clutch member 80 toward the right, Figs. 3 and 4, and through the clutch fingers 81, the collar 84 and clutch sleeve 67 would be pushed to the right, thus causing the split end of the chuck 56 to grip the blank in position to be operated upon by the grinding wheel. Then through the medium of the cam plate 43 and through the cam lever 41 and clutch members 34 and 35 the drum 30 would be locked to the shaft 31, and thus by the rotation of said drum and shaft the head and tail-stock spindles and the work held between them would be rotated. The grinding wheel would then be brought quickly forward into contact with the work by the cam 133, lever 130, link 129 and carriage 127 with the parts mounted thereon including the grinding wheel. After contacting with the work, the cam 133 is so designed that the grinding wheel feeds slowly into the work during the grinding operation and is then positively stopped from further advance and held to the work by the stop bracket 134 and thumb nut 136 and rod 135, Fig. 2, while the rotation of both the grinding wheel and the work continue, thereby grinding out the results of any spring or backlash in the machine or work and producing extremely accurate work with a fine finish. As above stated, the grinding wheel may be reciprocated axially while it revolves, the amplitude of this reciprocating movement being determined by the adjustment of the hand lever 166. This reciprocation breaks up any lines that otherwise might be formed on the work and cooperates with the rotary motion to produce a finely finished surface. The reciprocating movement may be stopped at any time by adjusting the lever 166 so that the axis of the pivots 162 come into alinement with the pivot screws 155. When the grinding operation has been finished the wheel is then quickly backed away to its initial position, the rotation of the work and its rotating devices are stopped, upon the withdrawal of clutch member 35 which causes spring 36 to exert its pressure through collar 37 and washer 38 against the head-stock frame 32, thus causing washer 38 to act as a brake to assist in quickly bringing the work-holding and rotating mechanism to rest. The work-holding means is now released, the tail-stock spindle is withdrawn and the work is ejected by means of the spring actuated ejector 111 or by gravity acting upon the work after the tail-stock has been withdrawn and the chuck released. It will be noted that as soon as the blank has been caught between the tail-stock center and the holding devices upon the head-stock spindle, the feeding fingers 207 are withdrawn from the blank and retreat to the magazine and while the machine is performing the rest of the operations hereinbefore set forth, the feeding fingers receive a new blank and are again ready to bring it forward at the proper time to be positioned as hereinbefore set forth.

After the grinding wheel has been returned to its initial position and the finished article ejected from the machine as described, the operations hereinbefore set forth are repeated on another blank, and thus the operation automatically continues until the machine is stopped by the operator shifting the lever 27 to the right, Fig. 1.

It is to be understood that in some classes of work a gripping chuck is not required, the work being driven in some cases by the head-stock and tail-stock centers, by friction alone and I do not wish to be understood as limiting my invention to any specific means for holding the work and rotating the same.

Having thus described my invention, what I desire to claim as new is:

1. A grinding machine having, in combination, means to grip one end of a blank, means to rotatably support the opposite ends of said blank during the grinding operation, means to feed said blank to said gripping and supporting means, means including said gripping and supporting means adapted to rotate said blank, a rotary grinding member, means to move said grinding member into and out of contact with said blank and means to release said blank from said gripping and supporting means.

2. A grinding machine having, in combination, a headstock, a chuck mounted upon said headstock and adapted to grip one end of a blank, a magazine adapted to hold a plurality of blanks, mechanism to feed said blanks one at a time from said magazine into alignment with said chuck, a tail-stock, a center therefor and means to move said center toward said headstock whereby a blank held by said feeding means may be inserted in said chuck, means to rotate said chuck and tail-stock center whereby a rotary motion may be imparted to said blank, a rotary grinding member, and means to move said grinding member into and out of contact with said blank.

3. A grinding machine having, in combination, a headstock, a chuck mounted upon said headstock and adapted to grip one end of a blank, a magazine adapted to hold a plurality of blanks, mechanism to feed said blanks one at a time from said magazine into alignment with said chuck, a tail-stock, a center therefor and means to move said center toward said headstock whereby a blank held by said feeding means may be inserted in said chuck, means to rotate said chuck and tail-stock center whereby a rotary motion may be imparted to said blank, a rotary grinding member, means to move said grinding member into and out of contact with said blank and means to eject said blank from said chuck.

4. A grinding machine having, in combination, means to support a blank at opposite ends thereof during the grinding operation, means to rotate said blank, a grinding wheel, means to move said grinding wheel into engagement with said blank, means to reciprocate said wheel laterally of said wheel, means to automatically release said blank from operative engagement with its supports and means to eject said blank from one of said supports.

5. A grinding machine having, in combination, means to support a blank at opposite ends thereof during the grinding operation, means to grip said blank at one end thereof, means to rotate said gripping means, a grinding wheel, means to move said grinding wheel into engagement with said blank and means to successively prevent the rotation of said blank, ungrip one end of said blank, remove the support from the other end of said blank and eject said blank from said gripping means.

6. A grinding machine having, in combination, means to support a blank at opposite ends thereof during the grinding operation, means to rotate said blank, a grinding wheel, means to move said grinding wheel into engagement with said blank, a magazine, means to automatically feed a blank from said magazine to said supporting means and means to automatically and successively prevent the rotation of said blank and release the blank from operative engagement with its supports.

7. A grinding machine having, in combination, means to support and grip a blank at one end thereof during the grinding operation, means to center said blank at the other end thereof, means to rotate said blank, a grinding wheel, means to move said grinding wheel into engagement with said blank and means to successively prevent the rotation of said blank, ungrip one end of said blank and remove the centering means from the other end of said blank, a magazine and means to automatically feed a blank from said magazine to said supporting and gripping means.

8. A grinding machine having, in combination, means to support a blank at opposite ends thereof during the grinding operation, means to grip said blank at one end thereof, means to rotate said gripping means, a grinding wheel, means to move said grinding wheel into engagement with said blank, a lever, a cam adapted to actuate said lever and means connected to said lever adapted to successively prevent the rotation of said blank, ungrip one end of said blank and remove the support from the other end of said blank.

9. A grinding machine having, in combination, means to support a blank at opposite ends thereof during the grinding operation, means to grip said blank at one end thereof, means to rotate said gripping means, a grinding wheel, means to move said grinding wheel into engagement with said blank, a lever, a cam adapted to actuate said lever and means connected to said lever adapted to successively prevent the rotation of said blank, ungrip one end of said blank and remove the support from the other end of said blank, a magazine and means to feed blanks one at a time from said magazine to said work gripping means.

10. A grinding machine having, in combination, a headstock and a tail-stock adapted to support and grip a blank therebetween, means to rotate said blank, a grinding wheel, means to move said grinding wheel into engagement with said blank, a lever and a cam adapted to operate said lever to successively stop the rotation of said work, cause said headstock to release said blank and remove said tail-stock from engagement with said blank.

11. A grinding machine having, in combination, a head-stock and a tail-stock adapted to support and grip a blank therebetween, means to rotate said blank, a grinding wheel, means to move said grinding wheel into engagement with said blank, a lever and a cam adapted to operate said lever to successively stop the rotation of said work, cause said head-stock to release said blank and remove said tail-stock from engagement with said blank, and means to eject said blank from said head-stock.

12. A grinding machine having, in combination, a head-stock and a tail-stock adapted to support and grip a blank therebetween, means to rotate said blank, a grinding wheel, means to move said grinding wheel into engagement with said blank, a lever and a cam adapted to operate said lever to successively stop the rotation of said work, cause said head-stock to release said blank and remove said tail-stock from engagement with said blank, a magazine adapted to hold a plurality of blanks and means adapted to automatically feed said blanks one by one from said magazine to said work supporting and gripping means.

13. A grinding machine having, in combination, a head-stock and a tail-stock adapted to support and grip a blank therebetween, means to rotate said blank, a grinding wheel, a carriage upon which said grinding wheel is mounted, means to impart a reciprocatory motion to said carriage toward and away from said blank, a lever and a cam adapted to operate said lever to successively stop the rotation of said blank, cause said head-stock to release said blank and remove said tail-stock from engagement with said blank.

14. A grinding machine having, in combination, a headstock and a tailstock adapted to support and grip a blank therebetween, means to rotate said blank, a grinding wheel, a carriage upon which said grinding wheel is mounted, means to impart a reciprocatory motion to said carriage toward and away from said blank, a lever and a cam adapted to operate said lever to successively stop the rotation of said blank, cause said headstock to release said blank and remove said tail-stock from engagement with said blank, a magazine and means to automatically feed blanks one at a time from said magazine to said blank gripping means.

15. A grinding machine having, in combination, a headstock and a tailstock adapted to support and grip a blank therebetween.

means to rotate said blank, a grinding wheel, a carriage upon which said grinding wheel is mounted, means to set said grinding wheel at different angles upon said carriage, means to impart a reciprocatory motion to said carriage, a lever, a cam adapted to operate said lever to successively stop the rotation of said blank, cause said headstock to release said blank and remove said tailstock from engagement with said blank.

16. A grinding machine having, in combination, a headstock and a tailstock adapted to support and grip a blank therebetween during the grinding operation, means to rotate said blank, a grinding wheel, a carriage upon which said grinding wheel is mounted, a cam, means connecting said cam and said carriage adapted to impart a reciprocatory motion to said carriage, a stop for said carriage adapted to eliminate the results of inaccuracies and lost motion between said cam and the connections to said carriage, means to rotate said cam, means to set said grinding wheel at different angles upon said carriage, a magazine adapted to hold a plurality of blanks and means to feed said blanks one at a time from said magazine to said headstock and tailstock.

17. A grinding machine having, in combination, oppositely disposed means to support a blank at opposite ends thereof and mechanism to rotate both of said oppositely disposed supporting means during the grinding operation, means to feed said blank to said supporting means, a rotary grinding member, means to move said grinding member into and out of contact with said blank, means to impart a reciprocatory motion to said grinding member in a direction substantially at right angles to its plane of rotation, and means to release said blank from said supporting means.

18. A grinding machine having, in combination, oppositely disposed means to support a blank at opposite ends thereof and mechanism to rotate both of said oppositely disposed supporting means during the grinding operation, means to feed said blank to said supporting means, a rotary grinding member, means to move said grinding member into and out of contact with said blank, means to impart a reciprocatory motion to said grinding member in a direction substantially at right angles to its plane of rotation, means to adjust the extent of said last mentioned movement, and means to release said blank from said supporting means.

19. A grinding machine having, in combination, means to support and rotate a blank, a magazine adapted to hold a plurality of blanks, a carrier, a pair of spring actuated fingers pivotally mounted on said carrier and adapted to receive a blank from said magazine and means to move said carrier with said fingers and a blank held thereby from said magazine to said supporting means, a rotary grinding member and means to move said grinding member into and out of contact with a blank held by said supporting means.

20. A grinding machine having, in combination, means to support and rotate a blank, a magazine adapted to hold a plurality of blanks, a lever, a pair of spring actuated fingers pivotally mounted on said lever and adapted to receive a blank from said magazine and means to move said lever with said fingers and a blank held thereby from said magazine to said supporting means, a rotary grinding member and means to move said grinding member into and out of contact with a blank held by said supporting means.

21. In a grinding machine, the combination of a grinding wheel, means for rotating said wheel, and mechanism for vibrating said wheel axially thereof while it revolves, said mechanism being adjustable to stop the vibration of the wheel without stopping either said mechanism or said wheel.

22. In a grinding machine, the combination of means for supporting and rotating a blank for the grinding operation, a rotary grinding wheel, mechanism for relatively moving said grinding wheel and blank to bring them into operative engagement, mechanism for vibrating said wheel axially thereof while it operates on said blank, and means whereby said mechanism may be adjusted while the wheel continues to revolve and said mechanism continues in operation to change the amplitude of vibration of the wheel or to stop said vibration, as desired.

23. In a grinding machine, the combination of a rotary grinding wheel, power driven mechanism including a lever for reciprocating said wheel axially thereof while the wheel revolves, and means including a lever operable while the wheel continues to rotate uninterruptedly and said mechanism continues in operation to adjust the amplitude of vibration of said wheel or to stop said vibration, as desired.

24. In a grinding machine, the combination of means for supporting and rotating a blank for the grinding operation, a rotary grinding wheel for operating on said blank, mechanism for relatively moving said grinding wheel and blank to bring them into operative engagement, mechanism for vibrating said grinding wheel axially thereof while it operates on said blank, and means operable to stop said vibratory movement without interrupting the rotation of said grinding wheel or otherwise changing the operation of said wheel on said blank.

In testimony whereof I have hereunto signed my name to this specification.

WARREN F. FRASER.